United States Patent [19]
Zehren

[11] 4,051,989
[45] Oct. 4, 1977

[54] CABLE PULLING APPARATUS

[75] Inventor: James N. Zehren, Bartlesville, Okla.

[73] Assignee: TRW, Inc., Cleveland, Ohio

[21] Appl. No.: 616,320

[22] Filed: Sept. 24, 1975

[51] Int. Cl.² ............................................. B65H 17/20
[52] U.S. Cl. .................................. 226/190; 254/175.3
[58] Field of Search ................... 254/175.3, 175.5, 138, 254/147, 190 R; 226/173, 183, 190, 193; 57/90

[56] References Cited

U.S. PATENT DOCUMENTS

| 2,255,656 | 9/1941 | Dreber | 226/173 |
| 2,339,762 | 1/1944 | Bruestle | 226/173 |
| 3,310,210 | 3/1967 | Reib | 226/183 |
| 3,684,145 | 8/1972 | Jenkins | 226/173 |

Primary Examiner—Albert J. Makay
Assistant Examiner—Kenneth Noland
Attorney, Agent, or Firm—Shapiro and Shapiro

[57] ABSTRACT

Apparatus for moving flexible elongated members, such as cable, in which a wheel having a peripheral abutment surface against which the elongated member is to be clamped, carries a plurality of pivoting clamp elements spaced circumferentially. The position of the clamp elements relative to the peripheral surface of the wheel is controlled by a guide track followed by the clamp elements as the wheel rotates. When the clamp elements have been closed upon a flexible member carried by the periphery of the wheel, pressure is applied to the clamp elements from an arcuate surface of a block adjacent to a portion of the periphery of the wheel, the position of the block relative to the wheel being adjustable.

6 Claims, 3 Drawing Figures

U.S. Patent
Oct. 4, 1977
4,051,989
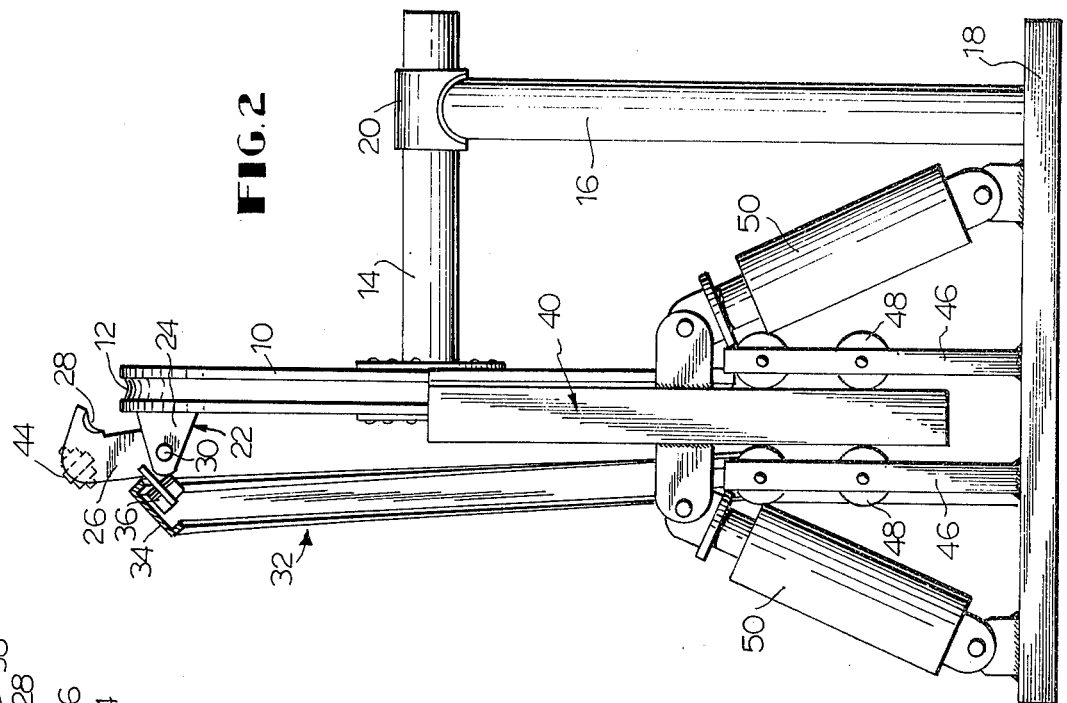
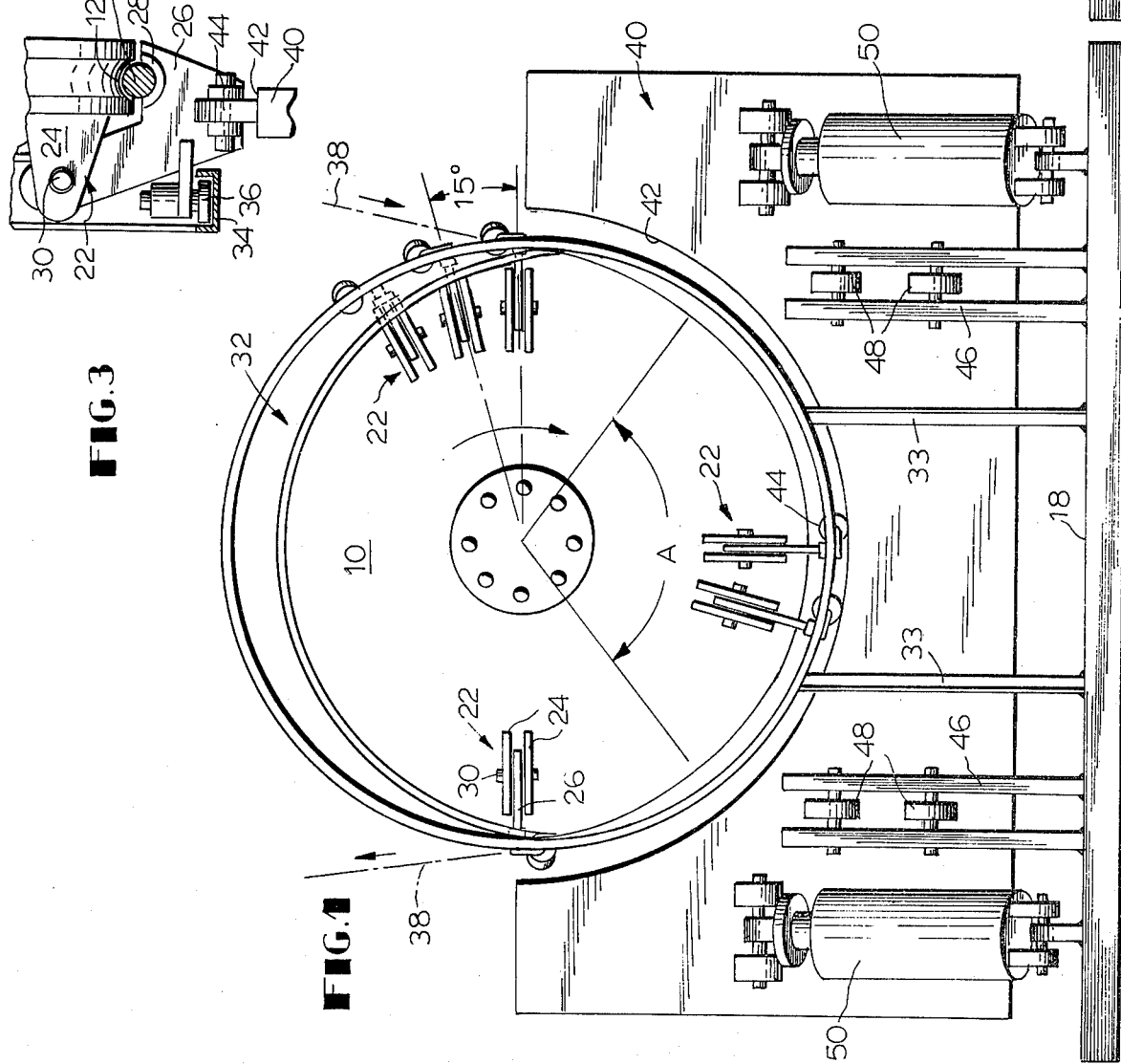

CABLE PULLING APPARATUS

BACKGROUND OF THE INVENTION

This invention relates to apparatus for moving elongated flexible members and is more particularly concerned with improved apparatus for pulling cables and the like.

Cable pulling apparatus employed heretofore is, in general, complex and expensive. One commercial cable handling system employs a pair of large traction wheels with V-groove peripheral surfaces, the cable being trained about the wheels in a figure eight configuration to permit the application of high tension to the cable when the wheels are rotated. In U.S. Pat. No. 2,853,273, issued to Berge, a cable pulling apparatus is disclosed in which hydraulically actuated pistons carried by a drum press the cable against a surface of the drum as the drum is rotated. Somewhat similar apparatus is disclosed in French Pat. No. 1,519,588, both apparatuses being rather complex. U.S. Pat. No. 3,104,792, issued to Walton, discloses a wire pulling wheel carrying a series of projections pressing the wire against a serpentine surface as the wheel rotates. This arrangement distorts the wire and is limited in terms of the force which can be applied. Swiss Pat. No. 387,571 discloses a complex cable traction device employing moving chains with cooperating cable-engaging clamp elements. Again, the apparatus is rather complex. U.S. Pat. No. 3,329,406, issued to Flair, discloses a cable drive in which the cable is wrapped several turns about a drum. In the apparatus of U.S. Pat. No. 3,680,758, granted to Kinnicutt, a bendable rod is directed about the periphery of a wheel by a plurality of smaller guide wheels. Neither apparatus fulfills the purposes of the present invention.

BRIEF DESCRIPTION OF THE INVENTION

An object of the present invention is to provide an improved apparatus for moving elongated flexible members, such as cable.

A further object of the invention is to provide apparatus of the foregoing type that is simpler, more economical, and more effective than comparable apparatus of the prior art.

Briefly stated, a preferred embodiment of the invention employs a rotating wheel having a peripheral abutment surface against which an elongated flexible member is to be clamped. The wheel carries a series of pivoting clamp elements spaced circumferentially, and the position of the clamp elements relative to the periphery of the wheel is controlled by a guide track followed by the clamp elements. Pressure is applied to the clamp elements from an arcuate abutment surface of a block adjacent to the wheel, the position of which relative to the wheel is adjustable.

BRIEF DESCRIPTION OF THE DRAWING

The invention will be further described in conjunction with the accompanying drawing, which illustrates a preferred and exemplary embodiment, and wherein:

FIG. 1 is a side elevation view of the invention;

FIG. 2 is an end elevation view; partly in section; and

FIG. 3 is a fragmentary partly sectional end elevation view illustrating the manner in which the cable is clamped.

DETAILED DESCRIPTION OF THE INVENTION

Referring to the drawing, the preferred embodiment of the apparatus of the invention comprises a cable pulling or tension wheel 10 having a peripheral abutment surface 12 against which a flexible elongated member, such as a cable, is to be clamped. As shown, the cross-section of surface 12 may be arcuate. Wheel 10 is fixed to a rotating shaft 14 supported upon a framework 16 and base 18 via a suitable bearing 20. Shaft 14 is rotated by any suitable power source (not shown). Wheel 10 carries a series of clamping members 22 spaced circumferentially of the wheel at one side thereof. Each clamping member may comprise a pair of parallel plates 24 welded or otherwise affixed to the wheel, the plates pivotally supporting an arm 26 constituting a clamping element having a clamping surface 28 adapted to move toward and away from the peripheral surface 12 of the wheel. Clamping surface 28 may have a curved configuration complementing surface 12. As shown, each pair of plates 24 is positioned along a radius of wheel 10 and has a pivot pin 30 positioned along a chord of the wheel for supporting the associated arm 26. For clarity of illustration only a few clamping members 22 are shown, it being understood that in practice the clamping members will preferably be provided at regularly spaced locations (e.g., 15° apart) around the entire circumference of the wheel.

To control the position of the clamping elements 26 with respect to the periphery of the wheel 10 a guide track 32 is provided adjacent to one side of the wheel, being supported on the base 18 by risers 33. The guide track, which is generally annular, may be formed of a channel 34 with the open side facing the axis of rotation of the wheel 10. Each arm 26 of the clamping members 22 carries a roller 36 which engages and follows the guide track 32. Throughout a substantial portion of its length, at the lower part of the guide track 32, the track is parallel to and near the periphery 12 of wheel 10, as shown in FIG. 3, so that the clamping surface 28 of each clamping member transversing that portion is closed upon a flexible elongated member such as calbe 38 carried by the periphery 12 of wheel 10. In FIG. 1, the angle A indicates that portion of the track configured to maintain the clamp elements 26 closed against the cable 38. The remainder of track 32 slopes away from wheel 10, being turned about its length to accommodate the orientation of rollers 36 as shown in FIG. 2, so that the guide rollers 36 move the clamping surfaces 28 toward the peripheral surface 12 of the wheel as the clamp elements 26 move downwardly and move the clamping surfaces 28 away from the peripheral surface 12 of the wheel as the clamp elements 26 move upwardly. By this arrangement, the clamp elements are effective to engage the cable 38 for a portion of the rotation of the wheel and then to release the cable. The cable may be fed onto and off of wheel 10, as indicated in phantom lines in FIG. 1, by suitable idler wheels (not shown).

In order to apply a strong clamping pressure to the clamp elements 26 a block 40 is provided, the block having an arcuate abutment surface 42 which is parallel to the peripheral surface 12 of the wheel through an angle approximately the same as angle A and which then diverges from the peripheral surface of the wheel at opposite ends of surface 42. Each clamp element 26 also carries a further roller 44 which engages and rolls upon surface 42, clamping pressure being applied from the block 40 to the clamp elements 26 by this arrangement. In order to adjust the clamping pressure, block 40 is supported for movement toward and away from the wheel 10. For this purpose frames 46 carrying block-engaging rollers 48 are provided at opposite sides of the block mounted upon the base 18. Hydraulic rams 50 have their cylinders pivotally connected to base 18 and their piston rods pivotally connected to the block 40, so that extension or contraction of the rams is effective to adjust the position of the block relative to the periphery of the wheel.

It is apparent that the invention provides a simple yet highly effective apparatus for moving elongated flexible members. Complexities such as chains, or hydraulically actuated pistons carried by the wheel, are avoided.

While a preferred embodiment of the invention has been shown and described, it will be apparent to those skilled in the art that changes can be made in this embodiment without departing from the principles and spirit of the invention, the scope of which is defined in the appended claims. For example, the lower portion of guide track 32 may be eliminated, since abutment surface 42 maintains the proper orientation of clamping elements 26 along the bottom of wheel 10 and thus constitutes part of the guide means for the clamping elements.

The invention claimed is:

1. Apparatus for moving a flexible elongated member, comprising a rigid wheel supported for rotation about an axis and having as a part thereof of circular abutment surface along the circumference of the wheel against which the elongated member is to be clamped during rotation of the wheel, a plurality of clamping means supported upon the wheel at positions spaced circumferentially of the wheel, each of said clamping means comprising a clamp element supported for movement toward and away from said abutment surface, guide means adjacent to the wheel for moving said clamp elements toward said abutment surface during a portion of the rotation of the wheel and for moving said clamp elements away from said abutment surface during another portion of the rotation of the wheel, and means for pressing said clamp elements toward said abutment surface and against said elongated member located between said clamp elements and said abutment surface during a portion of the rotation of said wheel intermediate the aforesaid portions, said pressing means comprising a stationary abutment surface, each of said clamp elements having means for engaging said stationary abutment surface said engagement with said stationary abutment surface applying a force to a clamp element and forcing the clamp element toward the abutment surface of said wheel to clamp said elongated member against the abutment surface of said wheel.

2. Apparatus in accordance with claim 1, wherein said abutment surface of said wheel is a peripheral surface supported from the center of said wheel at opposite sides of said wheel and wherein said stationary abutment surface comprises an arcuate edge surface of a block surrounding a portion of the circumference of the wheel, and further comprising means for adjusting the position of said block with respect to the periphery of said wheel, whereby the pressure applied to said clamp elements may be adjusted.

3. Apparatus in accordance with claim 2, wherein said adjusting means comprising guide means for supporting said block for movement toward and away from the periphery of said wheel and means for moving said block.

4. Apparatus in accordance with claim 2, wherein said peripheral surface has an arcuate cross-section and said clamp elements have complementary arcuate clamping surfaces.

5. Apparatus in accordance with claim 1, wherein each of said clamp elements has a unitary rigid arm pivotally supported upon said wheel, a part of said arm having a surface engaging said elongated member and another part of said arm engaging said stationary abutment surface.

6. Apparatus in accordance with claim 1, wherein said guide means comprises a curved track generally following the circumference of said wheel.

* * * * *